United States Patent
Hanyu et al.

(10) Patent No.: US 12,279,626 B2
(45) Date of Patent: Apr. 22, 2025

(54) SOLID FOOD AND SOLID MILK HAVING EXCELLENT RESISTANCE TO BREAKAGE WHEN DROPPED

(71) Applicant: Meiji Co., Ltd., Tokyo (JP)

(72) Inventors: Keigo Hanyu, Tokyo (JP); Aya Kato, Tokyo (JP); Tetsu Kamiya, Tokyo (JP); Koji Yamamura, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 418 days.

(21) Appl. No.: 17/641,339

(22) PCT Filed: Sep. 3, 2020

(86) PCT No.: PCT/JP2020/033502
§ 371 (c)(1),
(2) Date: Mar. 8, 2022

(87) PCT Pub. No.: WO2021/049422
PCT Pub. Date: Mar. 18, 2021

(65) Prior Publication Data
US 2022/0354143 A1 Nov. 10, 2022

(30) Foreign Application Priority Data
Sep. 13, 2019 (JP) ................................. 2019-167796

(51) Int. Cl.
*A23C 9/18* (2006.01)
*A23P 30/10* (2016.01)

(52) U.S. Cl.
CPC ................ *A23C 9/18* (2013.01); *A23P 30/10* (2016.08)

(58) Field of Classification Search
CPC .................................. A23C 9/18; A23P 30/10
(Continued)

(56) References Cited

U.S. PATENT DOCUMENTS

2009/0175998 A1 7/2009 Shibata
2010/0316783 A1 12/2010 Toyoda et al.
(Continued)

FOREIGN PATENT DOCUMENTS

CN 106190641 12/2016
JP 2003-63951 3/2003
(Continued)

OTHER PUBLICATIONS

Extended European Search Report issued Aug. 17, 2023 in corresponding European Patent Application No. 20862442.9.
(Continued)

*Primary Examiner* — Brent T O'Hern
(74) *Attorney, Agent, or Firm* — Wenderoth, Lind & Ponack, L.L.P.

(57) ABSTRACT

A solid food is a solid food having a solid form obtained by compression molding a powder, in which in a case where a drop test in which the solid food is dropped onto a drop face is repeated until the solid food is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid food.

1 Claim, 9 Drawing Sheets

(58) Field of Classification Search
USPC .......................................................... 426/580
See application file for complete search history.

(56) References Cited

U.S. PATENT DOCUMENTS

2014/0017367 A1* 1/2014 Rastello-De Boisseson ...............
A23C 9/18
426/285
2022/0354143 A1 11/2022 Hanyu et al.

FOREIGN PATENT DOCUMENTS

| JP | 2012-196228 | 10/2012 |
| --- | --- | --- |
| JP | 5350799 | 8/2013 |
| JP | 2013-172742 | 9/2013 |
| JP | 5688020 | 1/2015 |
| JP | 6423983 | 11/2018 |
| WO | 2016/032320 | 3/2016 |
| WO | 2016/207666 | 12/2016 |
| WO | WO-2016207666 A2 * | 12/2016 |
| WO | 2019/131753 | 7/2019 |
| WO | 2021/049422 | 3/2021 |

OTHER PUBLICATIONS

International Search Report dated Nov. 10, 2020 in International (PCT) Application No. PCT/JP2020/033502.
Office Action issued Sep. 3, 2024 in Japanese Patent Application No. 2022-047294, with English-language Translation.
J. Amazon.co.jp [online], 2008 springs 8 × 20 bags, [search] on Aug. 22, 2024, URL:https://amzn.asia/d/gdZYjyv, (see top of p. 6).
Office Action issued Jun. 8, 2024 in corresponding Chinese Patent Application No. 202080063878.3, with English language translation.
"Innovative thinking method-How to want a new point?", China and Practice, Ed. 1, Dec. 1996, p. 194.

* cited by examiner

SOLID FOOD AND SOLID MILK HAVING EXCELLENT RESISTANCE TO BREAKAGE WHEN DROPPED

TECHNICAL FIELD

The present invention relates to a solid food and a solid milk.

BACKGROUND ART

As a solid food, a solid milk obtained by compression molding a powdered milk is known (see PTL 1 and PTL 2). This solid milk is required to have such solubility that it quickly dissolves when placed in warm water. At the same time, transportation suitability, that is, resistance to breakage that prevents breakage such as cracking or collapse from occurring during transportation or carrying, is also required.

PTL 1 discloses a food (solid milk) having an upper face having a flat region, a lower face having a flat region parallel to the flat region of the upper face, and a recess provided on either or both of the upper face and the lower face.

PTL 2 discloses a method for producing a solid milk, in which a gas is dispersed in a liquid milk, the liquid milk is sprayed and dried to form a powdered milk, and the obtained powdered milk is compression molded to form a solid milk. PTL 2 describes that a load [N] when a solid milk is fractured is obtained by pushing a solid milk having a rectangular parallelepiped shape by a fracture terminal using a commercially available load cell tablet hardness tester and the load is regarded as a hardness [N] of the solid milk.

CITATION LIST

Patent Literature

PTL 1: Japanese Patent No. 5,350,799
PTL 2: Japanese Patent No. 5,688,020

SUMMARY OF THE INVENTION

Technical Problem

When a solid food and a solid milk are handled in transportation, a store, a home, and the like, it is required to improve transportation suitability to prevent a product from being damaged when the product is dropped.

The present invention has been accomplished against the above background, and an object thereof is to provide a solid food and a solid milk that can prevent a product from being damaged when the product is dropped to improve transportation suitability.

Solution to Problem

A solid food of the present invention is a solid food having a solid form obtained by compression molding a powder, in which in a case where a drop test in which the solid food is dropped onto a drop face is repeated until the solid food is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid food.

A solid milk of the present invention is a solid milk having a solid form obtained by compression molding a powdered milk, in which in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk.

Advantageous Effects of the Invention

According to the solid food of the present invention, in the drop test, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, such that a product can be prevented from being damaged when the product is dropped to improve transportation suitability.

According to the solid milk of the present invention, in the drop test, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, such that a product can be prevented from being damaged when the product is dropped to improve transportation suitability.

DESCRIPTION OF EMBODIMENTS

Hereinafter, an embodiment of the present invention will be described. However, the embodiment to be described below is merely an example and can be appropriately modified within an apparent range for those skilled in the art.

EMBODIMENT (Configuration of Solid Milk 10S)

Figure 1:
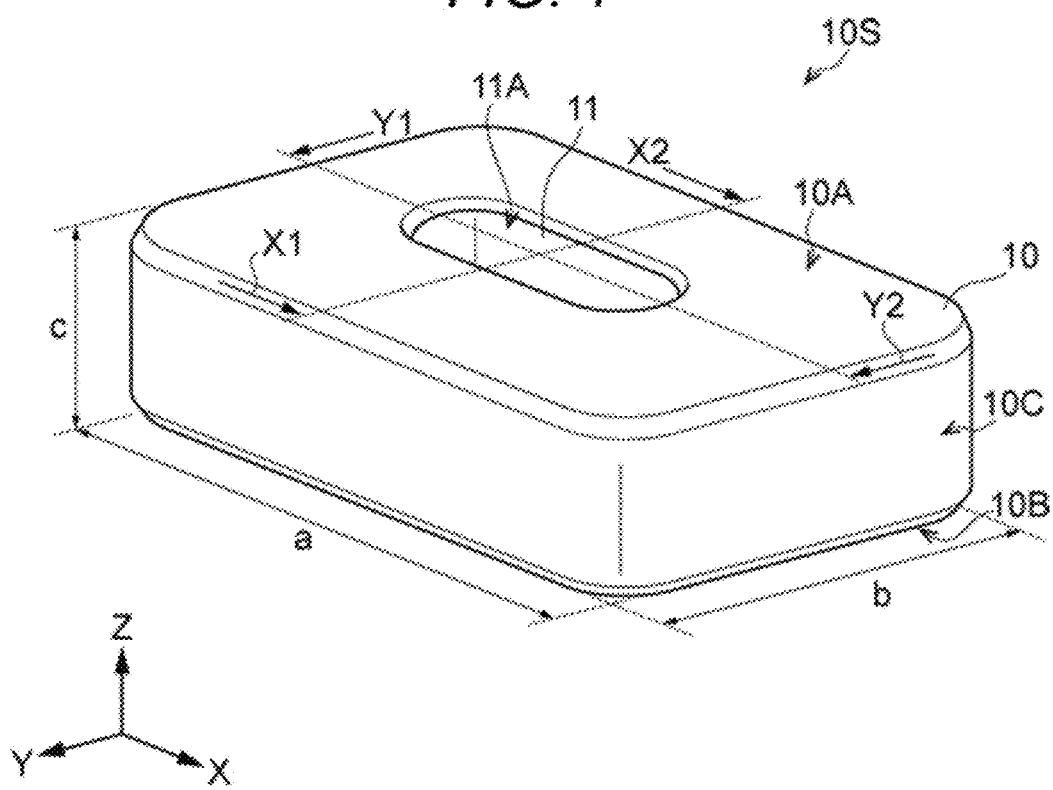
FIG. 1 is a perspective view of a solid milk according to an embodiment.
Figure 2:
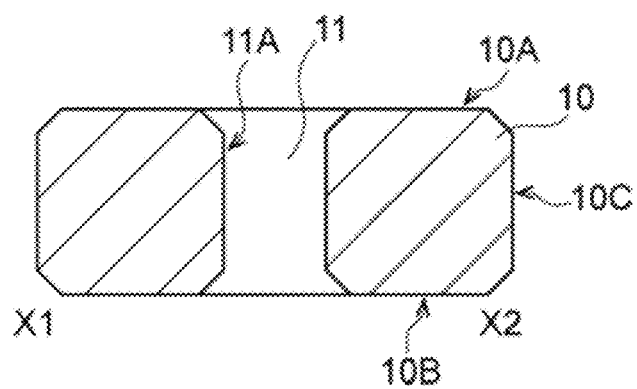
FIG. 2 is a cross-sectional view taken along X1-X2 of the solid milk of FIG. 1.
Figure 3:
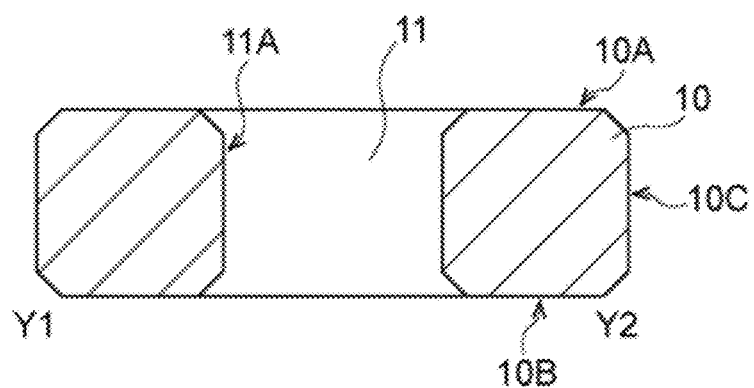
FIG. 3 is a cross-sectional view taken along Y1-Y2 of the solid milk of FIG. 1.

FIG. 1 is a perspective view of a solid milk 10S according to the present embodiment. FIG. 2 is a cross-sectional view parallel to a YZ plane taken along X1-X2 of FIG. 1. FIG. 3 is a cross-sectional view parallel to an XZ plane taken along Y1-Y2 of FIG. 1.

The solid milk 10S has a body 10 having a solid form obtained by compression molding a powdered milk. The body 10 has a first face 10A that is flat and parallel to an XY plane and a second face 10B that is flat and parallel to the XY plane. The first face 10A and the second face 10B are faces facing each other back to back. The shape of the body 10 is determined depending on the shape of a mold (a die of a tablet press) used in compression molding, but is not particularly limited as long as it is a shape having a certain degree of dimension (size, thickness, angle). The schematic shape of the body 10 is a round column shape, an elliptical column shape, a cubic shape, a rectangular parallelepiped shape, a plate shape, a polygonal column shape, a polygonal pyramid shape, a polyhedron shape, or the like. From the viewpoint of simplicity of molding, convenience of transportation, or the like, a round column shape, an elliptical column shape, and a rectangular parallelepiped shape are preferred. The schematic shape of the body 10 of the solid milk 10S illustrated in each of FIGS. 1 to 3 is a rectangular parallelepiped shape having a dimension of a×b×c (see FIG. 1) and the body 10 has a lateral face 10C parallel to the XZ plane or the YZ plane.

The faces facing each other back to back may be any faces as long as a positional relationship between one face and the other face is a positional relationship in which the hole penetrates the one face and the other face. In one example, the faces facing each other back to back are not directly connected to each other and have a positional relationship in which one face and the other face are connected to each other with another face interposed therebetween, and in another example, the faces facing each other back to back have a positional relationship in which one face and the other face including a curved face are directly connected to each other. The faces facing each other back to back do not necessarily have a parallel positional relationship.

A hole 11 penetrating the body 10 from the first face 10A to reach to the second face 10B are provided in the body 10. The number of holes 11 is at least one, and FIG. 1 illustrates a case of having one hole 11. The shape of the hole 11 is an oval shape, a rounded rectangle shape, an elliptical shape, a round shape, a rectangular shape, a square shape, or other polygonal shapes, for example, in a cross-section parallel to the XY plane. In the solid milk 10S illustrated in FIG. 1, the shape of the hole 11 is an oval shape. In a case where the shape of the hole 11 is a shape having corners such as a rectangular shape or a square shape, the corner may have a rounded shape. The size of the hole 11 is selected so that a volume obtained by subtracting the volume of the portion of the hole 11 from the volume of the rectangular parallelepiped shape of the body 10 becomes a predetermined value.

The position of the hole 11 is preferably a position without significant unevenness when viewed from the central position of the first face 10A. For example, it is preferable to have arrangement that the hole 11 is point-symmetric with respect to the position of the center of the first face 10A or arrangement that the hole 11 is line-symmetric with respect to a line parallel to the X axis passing through the center of the first face 10A or a line parallel to the Y axis. In the case of providing one hole 11, the hole 11 is provided at the center of the first face 10A. The hole 11 is arranged so that the longitudinal direction of the oval shape is parallel to the X axis at the central portion of the first face 10A. The same applies when the hole 11 is viewed from the second face 10B. A direction in which the hole 11 penetrates the body 10 is a direction passing through the first face 10A and the second face 10B, and is, for example, a direction substantially parallel to the Z axis.

Figure 4:
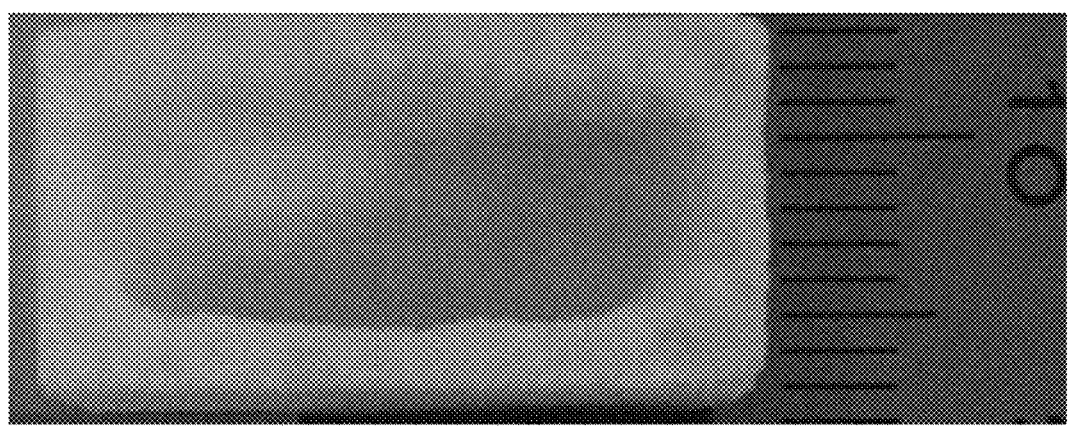
FIG. 4 is a photograph showing a result of a scraping test for observing an outer surface harder than an inner part of a body of the solid milk.

In the solid milk 10S of the present embodiment, each of the first face 10A, the second face 10B, and the inner surface 11A of the hole 11 is an outer surface harder than an inner part of the body 10. The inner surface 11A of the hole 11 constitutes a tubular column provided between the first face 10A and the second face 10B. Similarly, the lateral face 10C of the body 10 is an outer surface harder than the inner part of the body 10. The inner part of the body 10 used as an index of the hardness of the outer surface is, for example, a position where a distance from the first face 10A and a distance from the second face 10B are equal to each other at a portion at which the hole 11 is not provided, and a position where a distance from the inner surface 11A of the hole 11 and a distance from the lateral face 10C are equal to each other. Here, the inner surface 11A of the hole 11 and the lateral face 10C are faces facing each other. The outer surface of the solid milk 10S of the present embodiment is not provided with coating or the like, but is a layer harder than the inner part of the body 10 by performing a hardening treatment on a compression molded body of a powdered milk as described later. A method for observing that the outer surface of the body 10 is a layer harder than the inner part can be performed, for example, as follows. FIG. 4 is a photograph showing a result of a scraping test for observing the outer surface harder than the inner part of the body of the solid milk. In the scraping test, the body 10 of the solid milk is cut into a cross-section including an arbitrary position, and preferably the position where the distance from the first face 10A and the distance from the second face 10B are equal to each other at the portion at which the hole 11 is not provided and the position where the distance from the inner surface 11A of the hole 11 and the distance from the lateral face 10C are equal to each other. In the exposed cross-section, a soft portion of the inner part of the body 10 is scraped by an arbitrary scraping jig. Here, a relatively hard portion is left and only the soft portion is scraped by keeping a scraping force constant. As a result, as illustrated in FIG. 4, the soft portion of the inner part of the body 10 can be removed, and a hard outer surface of the body 10 can be left. As described above, the outer surface of the body 10 is a layer harder than the inner part of the body 10. That is, the fact that the outer surface of the body 10 is the layer harder than the inner part of the body 10 means that a force required to peel off a thin layer is relatively larger in the vicinity of the surface of the body 10 than in the inner part of the body 10.

A surface is a face that forms the outside of a material. A surface layer is a layer near the surface (vicinity of the surface) including the surface. In the present embodiment, the outer surface of the solid milk 10S refers to a layer near the surface including the surface, that is, a surface layer.

A corner part of the body 10 configured by the first face 10A and the lateral face 10C and a corner part of the body 10 configured by the second face 10B and the lateral face 10C are chamfered to be tapered inclined faces. Similarly, the corner part of the edge of the hole 11 configured by the first face 10A and the inner surface 11A of the hole 11 and the corner part of the edge of the hole 11 configured by the second face 10B and the inner surface 11A are chamfered to form tapered inclined faces. Each of the tapered inclined faces at the corner part of the body 10 and the edge of the hole 11 is the outer surface harder than the inner part of the body. In addition, a corner part configured by a face parallel to the YZ plane and a face parallel to an XZ plane in the lateral face 10C may have a rounded shape. By the corner part being chamfered or rounded, the situation of the solid milk 10S being fractured when being transported, etc. can be suppressed.

In the solid milk 10S of the present embodiment, at least one hole 11 penetrating the body 10 constituting the solid milk 10S is provided, and the inner surface of the hole 11 is an outer surface harder than the inner part of the body similar to the first face 10A and the second face 10B of the body 10. Therefore, the solid milk 10S of the present embodiment is configured so that in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk described below. Here, the "breakage" refers a state in which the weight of the solid milk is reduced by 9% or more of the initial weight due to breakage occurring at the time of dropping, and the broken surface spreads to four faces.

The solid milk of the present embodiment is preferably configured so that in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 4 times or more, the number of times of dropping leading to breakage when EF is $1\times10^{-4}$ [$(J/m^2)/(N/m^2)$] is 13 times or more, and the number of times of dropping leading to breakage when EF is $5\times10^{-5}$ [$(J/m^2)/(N/m^2)$] is more than 40 times, EF being obtained by dividing a dropping energy density in the drop test by a fracture stress of the solid milk described below. The solid milk of the present embodiment is more preferably configured so that in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 5 times or more, the number of times of dropping leading to breakage when EF is $1\times10^{-4}$ [$(J/m^2)/(N/m^2)$] is 17 times or more, and the number of times of dropping leading to breakage when EF is $5\times10^{-5}$ [$(J/m^2)/(N/m^2)$] is more than 50 times, EF being obtained by dividing a dropping energy density in the drop test by a fracture stress of the solid milk described below.

For example, a diameter of the hole 11 in a case where the hole 11 is rounded or substantially rounded in the cross-section parallel to the XY plane or an opening width of the hole 11 in a minor axis or a short side direction in a case where the hole 11 has an elongated shape such as an oval shape is 1.5 mm or more, preferably 2.0 mm or more, and more preferably 3.0 mm or more. An upper limit of the diameter or the opening width of the hole 11 is a half-length (a/2) of a long side in a long side direction of the first face 10A and the second face 10B of the solid milk 10S and a half-length (b/2) of a short side of in a short side direction thereof. In a direction in which the hole 11 penetrates, an angle formed by the normal lines of the first face 10A and the second face 10B is in a range of 0° or more and 300 or less, and the angle formed by the normal lines of the first face 10A and the second face 10B is preferably in a range of 0° or more and 10° or less. A direction in which the angle formed by the normal lines of the first face 10A and the second face 10B is 0° is a normal direction of the first face 10A and the second face 10B, that is, a direction perpendicular to the first face 10A and the second face 10B. An angle formed by the tapered inclined faces formed by the corner part of the edge of the hole 11 configured by the first face 10A and the inner surface 11A of the hole 11 and the corner part of the edge of the hole 11 configured by the second face 10B and the inner surface 11A is in a range of 15° to 75° with respect to the first face 10A and the second face 10B, and preferably in a range of 30° to 60° with respect to the first face 10A and the second face 10B. For example, the shape of the hole 11 in the cross-section parallel to the XY plane may also be a polygonal shape such as an octagon, a heptagon, a hexagon, a pentagon, a quadrangle, or a triangle, or an arbitrary shape such as a heart shape, a star shape, a spade shape, or a clover shape, in addition to a round or a substantially round shape.

The number of holes 11 formed in the solid milk 10S is at least one, and the number of holes 11 of the solid milk illustrated in FIG. 1 is one. The number of holes 11 is preferably 1 to 6. The number of holes 11 is more preferably 2 to 6, and a configuration in which the number of holes 11 is 6 can be preferably applied.

The components of the solid milk 10S are basically the same as components of the powdered milk as a raw material. The components of the solid milk 10S are, for example, fats, proteins, sugars, minerals, vitamins, moisture, and the like.

The powdered milk is produced from a liquid type milk (liquid milk) containing milk components (for example, components of a cow milk). The milk components are, for example, a raw milk (whole milk), a skimmed milk, cream, and the like. The moisture content ratio of the liquid milk is, for example, 40% by weight to 95% by weight. The moisture content ratio of the powdered milk is, for example, 1% by weight to 4% by weight. Nutritional components to be described below may be added to the powdered milk. The powdered milk may be a whole powdered milk, a powdered skimmed milk, or a creamy powder as long as it is suitable for producing the solid milk 10S. It is preferable that the content ratio of fat in the powdered milk is, for example, 5% by weight to 70% by weight.

The milk components which are used as a raw material for the powdered milk are, for example, derived from a raw milk. Specifically, the milk components are derived from a raw milk of cows (Holstein cows, Jersey cows, and the like), goats, sheep, buffalos, and the like. Fat components are contained in the raw milk, but a milk in which a part or the whole of the fat components are removed by centrifugal separation or the like to adjust the content ratio of fat may be used.

Further, the milk components which may be used as raw materials for the powdered milk are, for example, vegetable milk derived from a plant. Specific examples thereof include those derived from plants such as soybean milk, rice milk, coconut milk, almond milk, hemp milk, and peanut milk. Fat components are contained in the vegetable milk, but a milk in which a part or the whole of the fat components are removed by centrifugal separation or the like to adjust the content ratio of fat may be used.

The nutritional components which are used as a raw material for the powdered milk are, for example, fats, proteins, sugars, minerals, vitamins, and the like. One kind or two or more kinds of these may be added.

Proteins which may be used as a raw material for the powdered milk are, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins (α-lactoalbumin, β-lactoglobulin, and the like), for example, whey protein concentrate (WPC), whey protein isolate (WPI), and the like. Animal proteins are, for example, egg protein. Vegetable proteins are, for example, soybean protein and wheat protein. Examples of the amino acids include taurine, cystine, cysteine, arginine, and glutamine.

Fats (oils and fats) which may be used as a raw material for the powdered milk are animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Sugars which may be used as a raw material for the powdered milk are, for example, oligosaccharides, monosaccharides, polysaccharides, artificial sweeteners, and the like. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like. Incidentally, instead of or in addition to artificial sweeteners of sugars, non-sugar artificial sweeteners may be used.

Minerals which may be used as a raw material for the powdered milk are, for example, sodium, potassium, calcium, magnesium, iron, copper, zinc, and the like. One kind or two or more kinds of these may be added. Incidentally, instead of or in addition to sodium, potassium, calcium, magnesium, iron, copper, and zinc of minerals, either or both of phosphorus and chlorine may be used.

In the solid milk 10S, a large number of pores (for example, fine pores) generated when a powdered milk as a raw material for the solid milk 10S is compression molded exist. It is preferable that these plural pores are uniformly dispersed (distributed) into the solid milk 10S, and according to this, the solid milk 10S can be evenly dissolved, so that the solubility of the solid milk 10S can be enhanced. Herein, as the pore is larger (wider), a solvent such as water is easy to penetrate, so that the solid milk 10S can be rapidly dissolved. On the other hand, when the pore is too large, the hardness of the solid milk 10S may be reduced or the surface of the solid milk 10S may become coarse. The dimension (size) of each pore is, for example, 10 μm to 500 μm. Incidentally, the dimension (size) of each pore or the distribution of the large number of pores can be measured, for example, by a known means such as observation of the surface and cross-section of the solid milk 10S using a scanning electron microscope. By such measurement, the porosity of the solid milk 10S can be determined.

The porosity of the solid milk 10S is, for example, 30% to 60%. As the porosity is larger, the solubility is increased but the hardness (strength) is reduced. In addition, when the porosity is small, the solubility deteriorates. The porosity of the solid milk 10S is not limited within the range of 30% to 60% and is appropriately adjusted depending on use applications thereof, or the like.

The solid milk 10S is required to have a certain degree of solubility to a solvent such as water. The solubility can be evaluated, for example, by a time for the solid milk 10S to completely dissolve or the amount of non-dissolved residues at a predetermined time when the solid milk 10S as a solute and water as a solvent are prepared to have a predetermined concentration.

It is preferable that the solid milk 10S has a predetermined range of hardness. The hardness can be measured by a known method. In the present specification, the hardness is measured by using a load cell tablet hardness tester. The solid milk 10S having a rectangular parallelepiped shape is placed on the load cell tablet hardness tester while the second face of the solid milk 10S is set to a bottom face, is fixed by using one face parallel to the XZ plane and one face parallel to the YZ plane of the lateral face 10C, and is pushed by a fracture terminal of the hardness tester at a constant speed from another face side, which is not fixed and is parallel to the XZ plane, of the lateral face 10C in a minor axis direction of the first face 10A (Y-axis direction in FIG. 1) toward a direction in which the YZ plane is a fracture face, and a loading [N] when fracturing the solid milk 10S is regarded as a hardness (tablet hardness) [N] of the solid milk 10S. For example, a load cell tablet hardness tester (PORTABLE CHECKER PC-30) manufactured by OKADA SEIKO CO., LTD. is used. The fracture terminal built in the hardness tester has a contact face being in contact with the solid milk 10S. The contact face of the fracture terminal is a rectangle of 1 mm×24 mm and is disposed in a direction in which the long side of the rectangle is parallel to the Z axis. The contact face of the fracture terminal is configured to push a measurement point of the solid milk 10S in at least a part thereof. The speed of the fracture terminal pushing the solid milk 10S is set to 0.5 mm/s. The measurement of the hardness is not limited to the solid milk 10S and can also be applied to the case of measuring the hardness of a compression molded body of the powdered milk (unhardened solid milk 10S) described below. Regarding the hardness measured as described above, in order to avoid the situation of the solid milk 10S being fractured when the solid milk 10S is transported, etc. as much as possible, the hardness of the solid milk 10S is preferably 20 N or more and more preferably 40 N or more. On the other hand, since the solubility of the solid milk 10S deteriorates when the hardness of the solid milk 10S is too high, the hardness of the solid milk 10S is preferably 100 N or less and more preferably 70 N or less.

The hardness used herein is a physical quantity of power having a unit of [N (newton)]. The hardness increases as a fractured area of a solid milk sample becomes larger. Herein, the term "fracture" indicates that, when a vertical loading is statically applied to a sample such as the solid milk 10S, the sample is fractured, and a cross-sectional area generated when the sample is fractured is referred to as a "fractured area". That is, the hardness [N] is a physical quantity dependent on the dimension of the solid milk sample. There is mentioned a fracture stress [$N/m^2$] as a physical quantity not dependent on the dimension of the solid milk sample. The fracture stress is a power applied per unit fractured area at the time of the sample being fractured, is not dependent on the dimension of the solid milk sample, and is an index with which mechanical actions applied to solid milk samples can be compared even between solid milk samples having different dimensions. For example, in the case of the solid milk 10S, an ideal fractured area is represented by a dimension b×c that is the minimum fractured area of the solid milk and is expressed as "Fracture stress=Hardness/Fractured area". The description has been simply given using the hardness [N] in this specification, but the hardness may be represented as the fracture stress [$N/m^2$] obtained by dividing the hardness by the fractured area. For example, in a case where the dimension of the schematic shape of the solid milk 10S is a rectangular parallelepiped shape of 31 mm (a)×24 mm (b)×12.5 mm (c), an ideal fractured area is 300 $mm^2$ (24 mm (b)×12.5 mm (c)). The preferred hardness range of the solid milk 10S that is 20 N or more and 100 N or less corresponds to a preferred fracture stress range that is 0.067 $N/mm^2$ or more and 0.33 $N/mm^2$ or less obtained by dividing the hardness by the fractured area (300 $mm^2$).

The preferred fracture stress of the solid milk 10S is 0.067 $N/mm^2$ or more and 0.739 $N/mm^2$ or less when considering the range of the fractured area.

(Method for Producing Solid Milk 10S)

Next, the method for producing the solid milk 10S will be described. First, a powdered milk which is used as a raw material for the solid milk 10S is produced. In a process of producing a powdered milk, a powdered milk is produced, for example, by a liquid milk preparation step, a liquid milk clarification step, a sterilization step, a homogenization step, a condensation step, a gas dispersion step, and a spray drying step.

The liquid milk preparation step is a step of preparing a liquid milk of the above-described components.

The liquid milk clarification step is a step for removing fine foreign matters contained in the liquid milk. In order to remove these foreign matters, for example, a centrifuge, a filter, and the like may be used.

The sterilization step is a step for killing microorganisms such as bacteria contained in water, milk components, or the like of the liquid milk. Since microorganisms, which are considered to be actually contained, are changed depending on the type of the liquid milk, sterilization conditions (a sterilization temperature and a retention time) are appropriately set according to the microorganisms.

The homogenization step is a step for homogenizing the liquid milk. Specifically, the particle diameter of solid components such as fat globules contained in the liquid milk is decreased, and these components are uniformly dispersed into the liquid milk. In order to decrease the particle diameter of solid components of the liquid milk, for example, the liquid milk may be caused to pass through a narrow gap while being pressurized.

The condensation step is a step for condensing the liquid milk before the spray drying step to be described below. In condensation of the liquid milk, for example, a vacuum evaporator or an evaporator may be used. Condensation conditions are appropriately set within a range that components of the liquid milk are not excessively altered. According to this, a condensed milk can be obtained from the liquid milk. Subsequently, in the present embodiment, it is preferable that a gas is dispersed into the condensed liquid milk (condensed milk) and then spray drying is performed. In this case, the moisture content ratio of the condensed milk is, for example, 35% by weight to 60% by weight, and is preferably 40% by weight to 60% by weight and more preferably 40% by weight to 55% by weight. When such a condensed milk is used and a gas is dispersed, decreasing the density of the liquid milk (condensed milk) makes the condensed milk bulky, and the condensed milk in a bulky state in this way is sprayed and dried, so that a powdered milk having preferable characteristics when a solid milk is produced can be obtained. Incidentally, in a case where the moisture of the liquid milk is small or the treated amount of the liquid milk to be subjected to the spray drying step is small, this step may be omitted.

The gas dispersion step is a step for dispersing a predetermined gas into the liquid milk (condensed milk). In this case, an example of the predetermined gas includes a gas dispersed with a volume of $1\times10^{-2}$ times or more and 7 times or less the volume of the liquid milk, and the volume thereof is preferably $1\times10^{-2}$ times or more and 5 times or less the volume of the liquid milk, more preferably $1\times10^{-2}$ times or more and 4 times or less the volume of the liquid milk, and most preferably $1\times10^{-2}$ times or more and 3 times or less.

The predetermined gas is preferably pressured in order to disperse the predetermined gas into the liquid milk. The pressure for pressurizing the predetermined gas is not particularly limited as long as it is within a range enabling the gas to effectively disperse into the liquid milk, but the atmospheric pressure of the predetermined gas is, for example, 1.5 atm or more and 10 atm or less and preferably 2 atm or more and 5 atm or less. Since the liquid milk is sprayed in the following spray drying step, the liquid milk flows along a predetermined flow passage, and in this gas dispersion step, by running the predetermined gas pressurized into this flow passage, the gas is dispersed (mixed) into the liquid milk. By doing so, the predetermined gas can be easily and certainly dispersed into the liquid milk as a condensed milk.

As described above, through the gas dispersion step, the density of the liquid milk (condensed milk) is decreased, and the apparent volume (bulk) is increased. Incidentally, the density of the liquid milk may be obtained by dividing the weight of the liquid milk by the total volume of the liquid milk at a liquid state and a bubble state. In addition, the density of the liquid milk may be measured using an apparatus measuring a density according to the bulk density measurement (pigment: JIS K 5101 compliant) method based on JIS method.

Therefore, the liquid milk in a state where the predetermined gas is dispersed flows in the flow passage. Herein, the volume flow rate of the liquid milk in the flow passage is preferably controlled to be constant.

In the present embodiment, carbon dioxide (carbon dioxide gas) can be used as the predetermined gas. In the flow passage, the ratio of the volume flow rate of carbon dioxide to the volume flow rate of the liquid milk (hereinafter, the percentage thereof is also referred to as "$CO_2$ mixing ratio [%]") is, for example, 1% or more and 700% or less, preferably 2% or more and 300% or less, more preferably 3% or more and 100% or less, and most preferably 5% or more and 45% or less. As described above, by controlling the volume flow rate of the carbon dioxide to be constant to the volume flow rate of the liquid milk, homogeneousness of the powdered milk produced from this liquid milk can be enhanced. However, when the $CO_2$ mixing ratio is too large, the percentage of the liquid milk flowing in the flow passage is decreased so that the production efficiency of the powdered milk deteriorates. Therefore, the upper limit of the $CO_2$ mixing ratio is preferably 700%. In addition, the pressure for pressurizing the carbon dioxide is not particularly limited as long as it is within a range enabling the carbon dioxide to effectively disperse into the liquid milk, but the atmospheric pressure of the carbon dioxide is, for example, 1.5 atm or more and 10 atm or less and preferably 2 atm or more and 5 atm or less. Incidentally, by mixing continuously (in-line mixing) carbon dioxide and the liquid milk in a seal-up system, it is possible to certainly prevent bacteria or the like from being mixed so that the hygienic status of the powdered milk can be enhanced (or high cleanliness can be maintained).

In the present embodiment, the predetermined gas used in the gas dispersion step was carbon dioxide gas. Instead of carbon dioxide gas or with carbon dioxide gas, one or two or more gases selected from the group consisting of air, nitrogen ($N_2$), and oxygen ($O_2$) may be used or rare gas (for example, argon (Ar) or helium (He)) may be used. As described above, since various gases can be options, the gas dispersion step can be easily performed by using a gas easily available. In the gas dispersion step, when an inert gas such as nitrogen or rare gas is used, there is no possibility to react with nutritional components of the liquid milk or the like, and thus, it is preferable rather than using air or oxygen since there is less possibility to deteriorate the liquid milk. In this case, the ratio of the volume flow rate of the gas to the volume flow rate of the liquid milk is, for example, 1% or more and 700% or less, preferably 1% or more and 500% or less, more preferably 1% or more and 400% or less, and most preferably 1% or more and 300% or less. For example, according to Bell et al, (R. W. BELL, F. P. HANRAHAN, B. H. WEBB: "FOAM SPRAY METHODS OF READILY DISPERSIBLE NONFAT DRY MILK", J. Dairy Sci, 46 (12) 1963. pp. 1352-1356), air having about 18.7 times the volume of non-fat milk is dispersed into non-fat milk to obtain a powdered skimmed milk. In the present embodiment, by dispersing the gas within the above range, a powdered milk having characteristics preferable for producing a solid milk can be obtained. However, to certainly decrease the density of the liquid milk as a result of having dispersed the predetermined gas into a liquid milk in the gas dispersion step, it is preferable to use, as the predetermined gas, a gas which is easily dispersed into the liquid milk or a gas which is easily dissolved in the liquid milk. Therefore, a gas having a high degree of solubility in water (water solubility) is preferably used, and a gas in which a degree of solubility at 20° C. in 1 $cm^3$ of water is 0.1 $cm^3$ or more is preferred. Incidentally, carbon dioxide is not limited to a gas and may be dry ice or a mixture of dry ice and a gas. That is, in the gas dispersion step, a solid may be used as long as a predetermined gas can be dispersed into the liquid milk. In the gas dispersion step, carbon dioxide can be rapidly dispersed into the liquid milk in a cooling state by using dry ice, and as a result, a powdered milk having characteristics preferable for producing a solid milk can be obtained.

The spray drying step is a step for obtaining a powdered milk (powder) by evaporating moisture in the liquid milk. The powdered milk obtained in this spray drying step is a powdered milk obtained through the gas dispersion step and spray drying step. This powdered milk is bulky as compared to a powdered milk obtained not through the gas dispersion step. The volume of the former is preferably 1.01 times or more and 10 times or less that of the latter, may be 1.02 times or more and 10 times or less or 1.03 times or more and 9 times or less.

In the spray drying step, the liquid milk is spray dried in a state where the predetermined gas is dispersed into the liquid milk in the gas dispersion step and the density of the liquid milk becomes small. Specifically, it is preferable to spray dry the liquid milk in a state where the volume of the liquid milk after dispersing a gas is 1.05 times or more and 3 times or less, preferably 1.1 times or more and 2 times or less as compared to the volume of the liquid milk before dispersing a gas. That is, in the spray drying step, spray drying is performed after finishing the gas dispersion step. However, immediately after finishing the gas dispersion step, the liquid milk is not homogeneous. Therefore, the spray drying step is performed for 0.1 seconds or longer and 5 seconds or shorter, preferably, 0.5 seconds or longer and 3 seconds or shorter after finishing the gas dispersion step. That is, it is sufficient that the gas dispersion step and the spray drying step are continuously performed. By doing so, the liquid milk is continuously placed in a gas dispersion apparatus to disperse a gas, and the liquid milk into which the gas is dispersed is continuously supplied to a spray drying apparatus and can be continuously spray dried.

In order to evaporate moisture, a spray dryer may be used. Herein, the spray dryer includes a flow passage for flowing a liquid milk, a pressuring pump pressuring the liquid milk for flowing the liquid milk along the flow passage, a dry chamber having a wider room than that of the flow passage connecting to an opening of the flow passage, and a spraying apparatus (a nozzle, an atomizer, or the like) set at the opening of the flow passage. Further, the spray dryer transfers the liquid milk by the pressuring pump toward the dry chamber along the flow passage to be the above volume flow rate, the condensed milk is diffused by the spraying apparatus inside the dry chamber in the vicinity of the opening of the flow passage, and the liquid milk in a liquid drop (atomization) state is dried inside the dry chamber at a high temperature (for example, hot wind). That is, moisture is removed by drying the liquid milk in the dry chamber, and as a result, the condensed milk becomes a solid of a powder state, namely, a powdered milk. Incidentally, the moisture amount or the like in the powdered milk is adjusted by appropriately setting the drying condition in the drying chamber, so that it makes the powdered milk less likely to cohere. In addition, by using the spraying apparatus, the surface area per unit volume of liquid drop is increased so that drying efficiency is enhanced, and at the same time, the particle diameter or the like of the powdered milk is adjusted.

Through the steps as described above, a powdered milk suitable for producing a solid milk can be produced.

The powdered milk obtained as described above is compression molded to form a compression molded body of the powdered milk. Next, the obtained compression molded body of the powdered milk is subjected to a hardening treatment including a humidification treatment and a drying treatment. As described above, the solid milk 10S can be produced.

In the step of compression molding the powdered milk, a compression means is used. The compression means is, for example, a pressurization molding machine such as a tablet press or a compression testing apparatus. The tablet press includes a die serving as a mold in which a powdered milk (powder) is input and a punch capable of punching to the die. When a powdered milk is input in the die (mold) and punched by the punch, a compression pressure is applied to the powdered milk so that a compression molded body of the powdered milk can be obtained. In the present embodiment, for example, a lower punch of the tablet press has a projection part corresponding to the hole 11, an upper punch has a recess part corresponding to the projection part, and the projection part has such a shape that the projection part is insertable into the recess part. By performing the compression molding using such a punch, the hole 11 can be formed in the compression molded body of the powdered milk. Incidentally, in the compression molding step, it is preferable to continuously perform the compression operation of the powdered milk.

In the step of compression molding the powdered milk, the ambient temperature is not particularly limited, and may be, for example, room temperature. Specifically, the ambient temperature is, for example, 5° C. to 35° C. The ambient humidity is, for example, 0% RH to 60% RH. The compression pressure is, for example, 1 MPa to 30 MPa, preferably 1 MPa to 20 MPa. In particular, when the powdered milk is solidified, it is preferable that the porosity is controlled within a range of 30% to 60% and the hardness of the compression molded body of the powdered milk (before hardening) is controlled within a range of 4 N to 19 N by adjusting the compression pressure within a range of 1 MPa to 30 MPa. According to this, it is possible to produce a high utility solid milk 10S having both solubility and convenience (easy handleability). Incidentally, the compression molded body of the powdered milk has such a hardness (for example, 4 N or more) that the shape of the compression molded body of the powdered milk is not collapsed in at least the subsequent humidification step and drying step. For example, in a case where the dimension of the schematic shape of the compression molded body of the powdered milk (before hardening) is the same rectangular parallelepiped shape of 31 mm (a)×24 mm (b)×12.5 mm (c) as that of the solid milk 10S, the preferred hardness range of the compression molded body of the powdered milk (before hardening) that is 4 N or more and 19 N or less corresponds to a preferred fracture stress that is 0.013 N/mm$^2$ or more and less than 0.063 N/mm$^2$ by dividing the hardness by the fractured area (300 mm$^2$).

The humidification treatment is a step of subjecting the compression molded body of the powdered milk obtained by the compression molding step to the humidification treatment. When the compression molded body of the powdered milk is humidified, tackiness is generated on the surface of the compression molded body of the powdered milk. As a result, some of the powder particles in the vicinity of the surface of the compression molded body of the powdered milk become a liquid or a gel and are cross-linked to each other. Then, by performing drying in this state, the strength in the vicinity of the surface of the compression molded body of the powdered milk can be increased as compared to the strength of the inner part. The degree of cross-linking (degree of broadening) is adjusted by adjusting time at which the compression molded body of the powdered milk is put under a high-humidity environment (humidification time), and according to this, the hardness (for example, 4 N to 19 N) of the compression molded body of the powdered milk before the humidification step (unhardened solid milk 10S) can be increased to a target hardness (for example, 40 N) necessary as the solid milk 10S. However, the range (width) of the hardness that can be increased by adjusting the humidification time is limited. That is, when the compression molded body of the powdered milk is transported by a belt conveyer or the like to humidify the compression molded body of the powdered milk obtained after the compression molding, if the hardness of the compression molded body of the powdered milk is not sufficient, the shape of the solid milk 10S is not kept. In addition, if the hardness of the compression molded body of the powdered milk is too high during the compression molding, only the solid milk 10S having a small porosity and poor solubility is obtainable. Therefore, it is preferable to perform the compression molding so that the hardness of the compression molded body of the powdered milk before the humidification step (unhardened solid milk 10S) is sufficiently high and the solubility of the solid milk 10S is sufficiently kept.

In the humidification treatment, a humidification method of the compression molded body of the powdered milk is not particularly limited, and for example, a method of placing a compression molded body of the powdered milk under a high-humidity environment, a method of directly spraying water or the like to a compression molded body of the powdered milk, a method of blowing steam to a compression molded body of the powdered milk, and the like are mentioned. Examples of humidification means to humidify the compression molded body of the powdered milk include a high-humidity chamber, a sprayer, and steam.

The ambient humidity is, for example, within a range of 60% RH to 100% RH in a case where the compression molded body of the powdered milk is placed under a high-humidity environment. Further, the humidification time is, for example, 5 seconds to 1 hour and the temperature in a high-humidity environment is, for example, 30° C. to 100° C.

The moisture amount (hereinafter, also referred to as "amount of humidification") to be added to the compression molded body of the powdered milk in the humidification treatment can be appropriately adjusted. The amount of humidification is preferably 0.5% by weight to 3% by weight of the mass of the compression molded body of the powdered milk obtained after the compression molding step. When the amount of humidification is set to less than 0.5% by weight, it is not possible to provide a sufficient hardness (tablet hardness) to the solid milk 10S, which is not preferred. In addition, when the amount of humidification is more than 3% by weight, the compression molded body of the powdered milk is excessively dissolved into a liquid state or a gelled state so that the compression molded body of the powdered milk is deformed from the compression molded shape or is attached to an apparatus such as a belt conveyer during transporting, which is not preferable.

The drying treatment is a step for drying the compression molded body of the powdered milk humidified in the humidification treatment. According to this, surface tackiness on the compression molded body of the powdered milk is eliminated so that the solid milk 10S is easily handled. That is, the humidification treatment and the drying treatment correspond to a step of providing desired characteristics or quality as the solid milk 10S by increasing the hardness of the compression molded body of the powdered milk obtained after the compression molding.

In the drying treatment, a drying method of the compression molded body of the powdered milk is not particularly limited, and a known method capable of drying the compression molded body of the powdered milk obtained through the humidification treatment can be employed. For example, a method of placing the compression molded body of the powdered milk under a low-humidity and high-temperature condition, a method of bringing the compression molded body of the powdered milk into contact with dry air or high-temperature dry air, and the like are mentioned.

In the case of placing the compression molded body of the powdered milk under a low-humidity and high-temperature condition, the humidity is, for example, 0% RH to 30% RH. As described above, it is preferable to set the humidity to as a low level as possible. In this case, the temperature is, for example, 20° C. to 150° C. The drying time is, for example, 0.2 minutes to 2 hours.

When the moisture contained in the solid milk 10S is large, storage stability deteriorates and it is easy for deterioration in the flavor and the discoloration of appearance to progress. Therefore, in the drying step, the moisture content ratio of the solid milk 10S is preferably controlled (adjusted) to be no more than 1% higher or lower than the moisture content ratio of the powdered milk used as a raw material by controlling the conditions such as a drying temperature and a drying time.

The solid milk 10S produced in this way is generally dissolved in warm water and drunk. Specifically, warm water is poured into a container or the like provided with a lid and then the necessary number of pieces of the solid milk 10S are placed therein, or the warm water is poured after the pieces of the solid milk 10S are placed. Then, preferably, the solid milk 10S is rapidly dissolved by lightly shaking the container and drunk in a state with an appropriate temperature. Further, when, preferably, one to several pieces of the solid milk 10S (more preferably one piece of the solid milk 10S) are dissolved in warm water, the volume of the solid milk 10S may be adjusted to be a necessary amount of the liquid milk for one drinking, for example, to be 1 cm$^3$ to 50 cm$^3$. Incidentally, by changing the amount of the powdered milk used in the compression molding step, the volume of the solid milk 10S can be adjusted.

(Action and Effect of Solid Milk 10S)

In the solid milk 10S of the present embodiment, at least one hole 11 penetrating the body 10 constituting the solid milk 10S is provided, and the inner surface of the hole 11 is an outer surface harder than the inner part of the body similar to the first face 10A, the second face 10B, and the lateral face 10C of the body 10. Therefore, the solid milk 10S of the present embodiment is configured so that in a case where a drop test in which the solid milk is dropped onto a drop face is repeated until the solid milk is broken, the number of times of dropping leading to breakage when a dropping energy density per unit fracture stress EF is $2\times10^{-4}$ [(J/m$^2$)/(N/m$^2$)] is 3 times or more, the number of times of dropping leading to breakage when EF is $1\times10^{-4}$ [(J/m$^2$)/(N/m$^2$)] is 10 times or more, and the number of times of dropping leading to breakage when EF is $5\times10^{-5}$ [(J/m$^2$)/(N/m$^2$)] is more than 30 times, EF being obtained by dividing a dropping energy density in the drop test by a stress of the solid milk. Therefore, a product can be prevented from being damaged when the product is dropped to improve transportation suitability.

Modified Example 1

Figure 5:
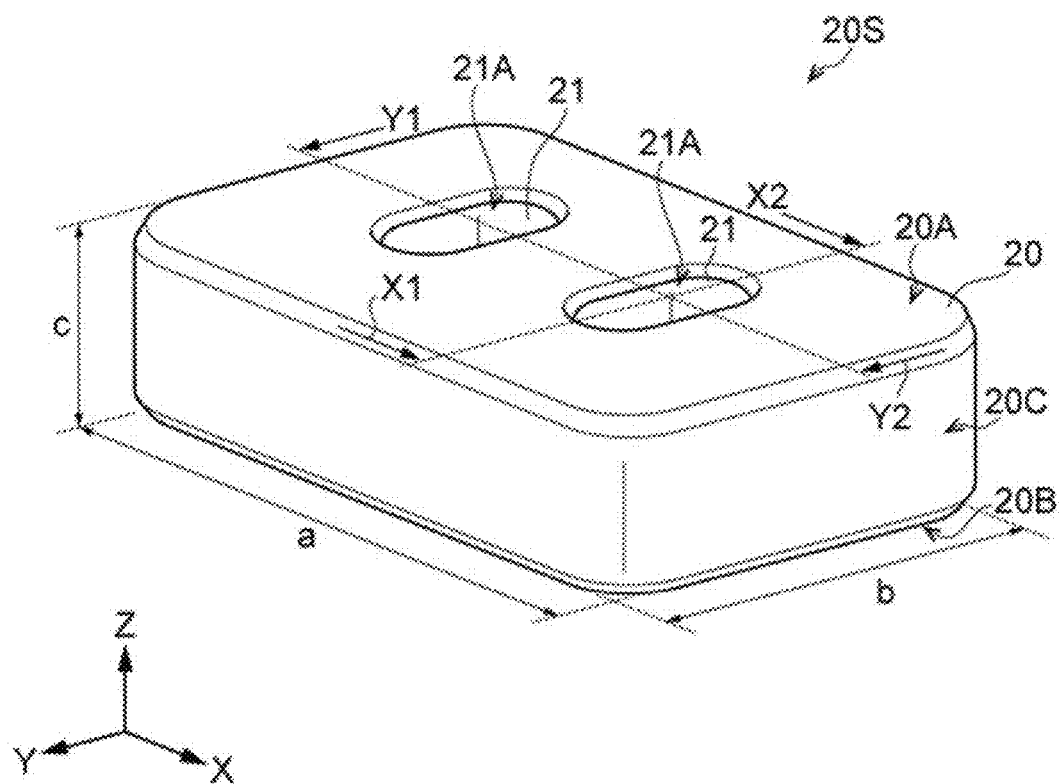
FIG. 5 is a perspective view of a solid milk according to Modified Example 1.
Figure 6:
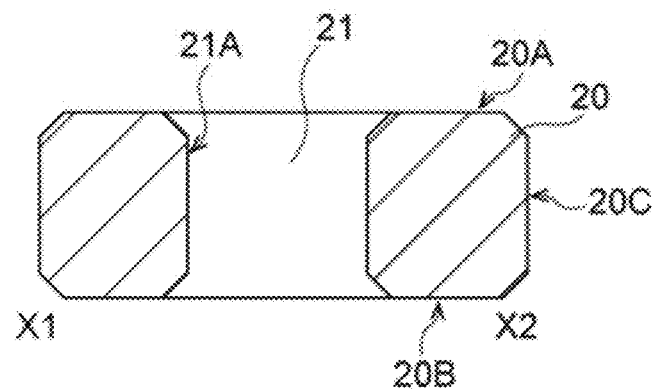
FIG. 6 is a cross-sectional view taken along X1-X2 of the solid milk of FIG. 5.
Figure 7:
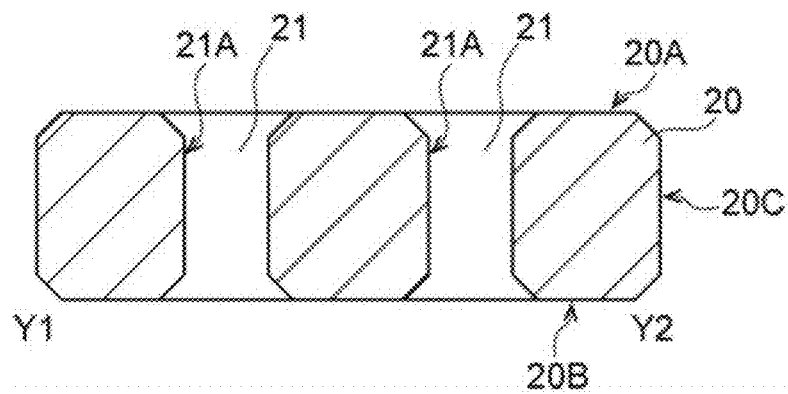
FIG. 7 is a cross-sectional view taken along Y1-Y2 of the solid milk of FIG. 5.

FIG. 5 is a perspective view of a solid milk 20S according to the present modified example. FIG. 6 is a cross-sectional view parallel to a YZ plane taken along X1-X2 of FIG. 5. FIG. 7 is a cross-sectional view parallel to an XZ plane taken along Y1-Y2 of FIG. 5. In the solid milk 10S illustrated in each of FIGS. 1 to 3, one hole 11 penetrating the body 10 is provided, but the number of holes may be 2 or more. In the present modified example, two holes 21 are provided.

The solid milk 20S has a body 20 having a solid form obtained by compression molding a powdered milk. The body 20 has a first face 20A that is flat and parallel to an XY plane and a second face 20B that is flat and parallel to the XY plane. The first face 20A and the second face 20B are faces back on to each other. The schematic shape of the body 20 is a rectangular parallelepiped shape, and the body 20 has a lateral face 20C parallel to an XZ plane or a YZ plane.

Two holes 21 penetrating the body 20 from the first face 20A to reach to the second face 20B are provided in the body 20. The shapes of the two holes 21 are an oval shape in the cross-section parallel to the XY plane and are the same. The sizes of the two holes 21 are selected so that a volume obtained by subtracting the total volume of the portions of the two holes 21 from the volume of the rectangular parallelepiped shape of the body 20 becomes a predetermined value.

The position of the two holes 21 is a position without significant unevenness when viewed from the central position of the first face 20A. The two holes 21 are arranged in a direction parallel to the X axis with the center part of the first face 20A interposed therebetween and are disposed so that a longitudinal direction of each of the holes 21 becomes a direction parallel to the Y axis. This is an arrangement that the two holes 21 are point-symmetric with respect to the center of the first face 20A or are line-symmetric with respect to a line parallel to the X axis passing through the center of the first face 20A or a line parallel to the Y axis. The interval between the two holes 21 is secured to be equal to or more than a predetermined value since a strength of the portion at the interval may not be maintained when the interval is too narrow. The same applies when the holes 21 are viewed from the second face 20B. A direction in which the holes 21 penetrate the body 20 is a direction passing through the first face 20A and the second face 20B, and is, for example, a direction substantially parallel to the Z axis.

The first face 20A, the second face 20B, the lateral face 20C, and the inner surface 21A of the hole 21 are outer surface harder than the inner part of the body 20. The inner surface 21A of the hole 21 constitutes a tubular column provided between the first face 20A and the second face 20B. The corner part of the body 20 and the edge of the hole 21 are chamfered to form outer surfaces harder than the inner part of the body 20.

Except for the above, the solid milk 20S has the same configuration as that of the solid milk 10S of the embodiment.

In the solid milk 20S of the present modified example, two holes 21 penetrating the body 20 constituting the solid milk 20S are provided, and the inner surface 21A of the hole 21 is an outer surface harder than the inner part of the body 20 similar to the first face 20A, the second face 20B, and the lateral face 20C of the body 20. Therefore, the solid milk 20S of the present embodiment is configured so that in a case where a drop test in which the solid milk is dropped onto a drop face is repeated until the solid milk is broken, the number of times of dropping leading to breakage when a dropping energy density per unit fracture stress EF is $2\times10^{-4}$ [(J/m$^2$)/(N/m$^2$)] is 3 times or more, the number of times of dropping leading to breakage when EF is $1\times10^{-4}$ [(J/m$^2$)/(N/m$^2$)] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk. Therefore, a product can be prevented from being damaged when the product is dropped to improve transportation suitability.

Modified Example 2

Figure 8:
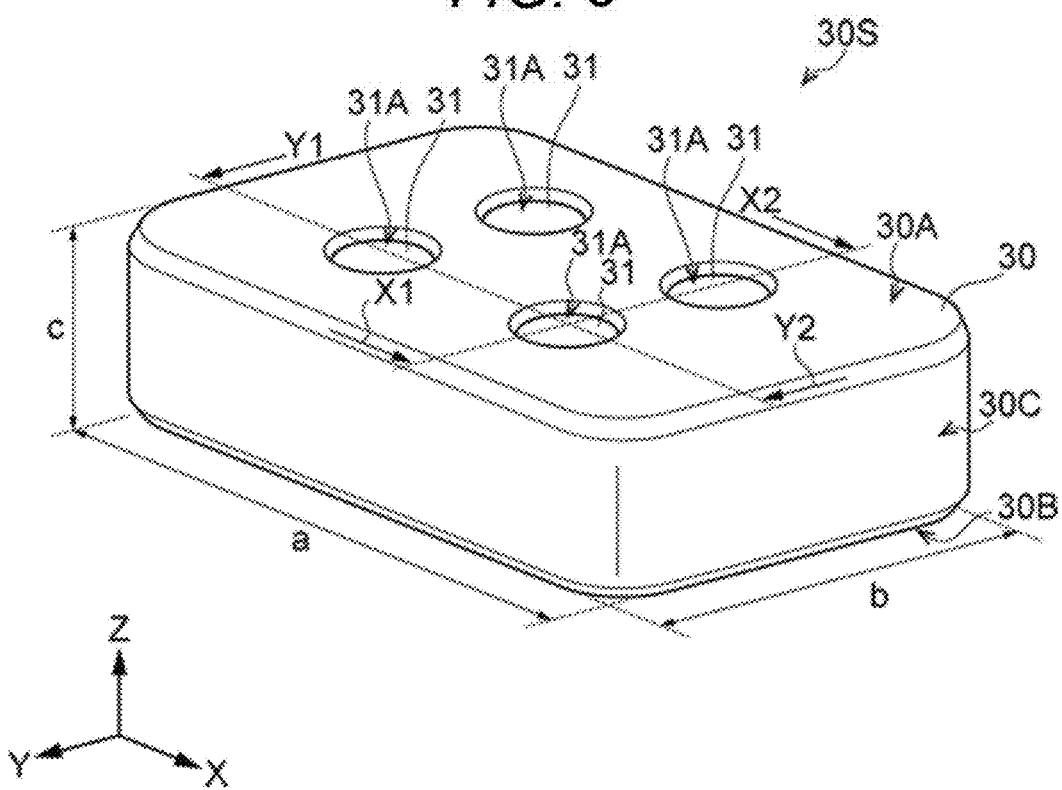
FIG. 8 is a perspective view of a solid milk according to Modified Example 2.
Figure 9:
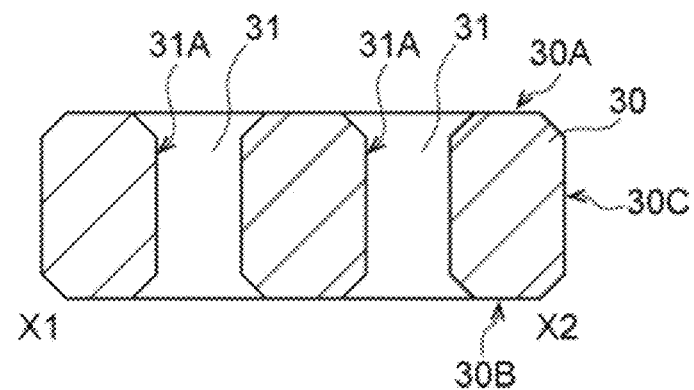
FIG. 9 is a cross-sectional view taken along X1-X2 of the solid milk of FIG. 8.
Figure 10:
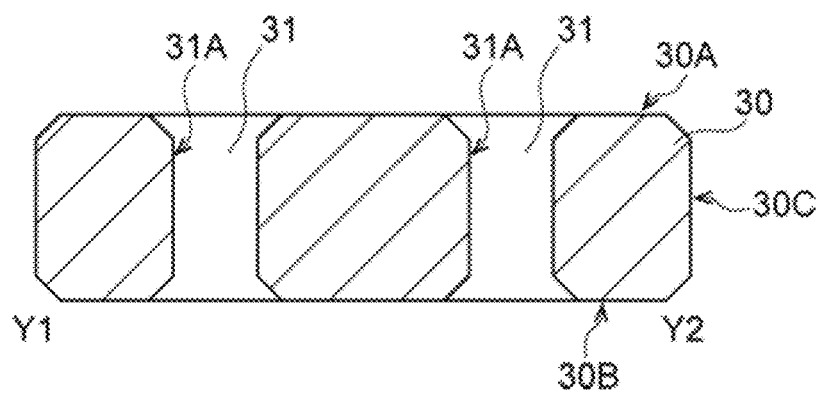
FIG. 10 is a cross-sectional view taken along Y1-Y2 of the solid milk of FIG. 8.

FIG. 8 is a perspective view of a solid milk 30S according to the present modified example. FIG. 9 is a cross-sectional view parallel to the YZ plane taken along X1-X2 of FIG. 8. FIG. 10 is a cross-sectional view parallel to the XZ plane taken along Y1-Y2 of FIG. 8. In the present modified example, four holes 31 are provided.

The solid milk 30S includes a rectangular parallelepiped-shaped body 30 having a first face 30A and a second face 30B facing each other back to back, and a lateral face 30C. Four holes 31 penetrating the body 30 from the first face 30A to reach to the second face 30B are provided in the body 30. The sizes of the four holes 31 are selected so that a volume obtained by subtracting the total volume of the portions of the four holes 31 from the volume of the rectangular parallelepiped shape of the body 30 becomes a predetermined value. The positions of the four holes 31 are arranged to be point-symmetric with respect to the central portion of the first face 30A or to be line-symmetric with respect to a line parallel to the X axis passing through the center of the first face 30A or a line parallel to the Y axis.

The first face 30A, the second face 30B, the lateral face 30C, and an inner surface 31A of the hole 31 are outer surface harder than an inner part of the body 30. The inner surface 31A of the hole 31 constitutes a tubular column provided between the first face 30A and the second face 30B. A corner part of the body 30 and an edge of the hole 31 are chamfered to form outer surfaces harder than the inner part of the body 30.

In the solid milk 30S of the present modified example, four holes 31 penetrating the body 30 constituting the solid milk 30S are provided, and the inner surface 31A of the hole 31 is an outer surface harder than the inner part of the body 30 similar to the first face 30A, the second face 30B, and the lateral face 30C of the body 30. Therefore, the solid milk 30S of the present embodiment is configured so that in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk. Therefore, a product can be prevented from being damaged when the product is dropped to improve transportation suitability.

Modified Example 3

Figure 11:
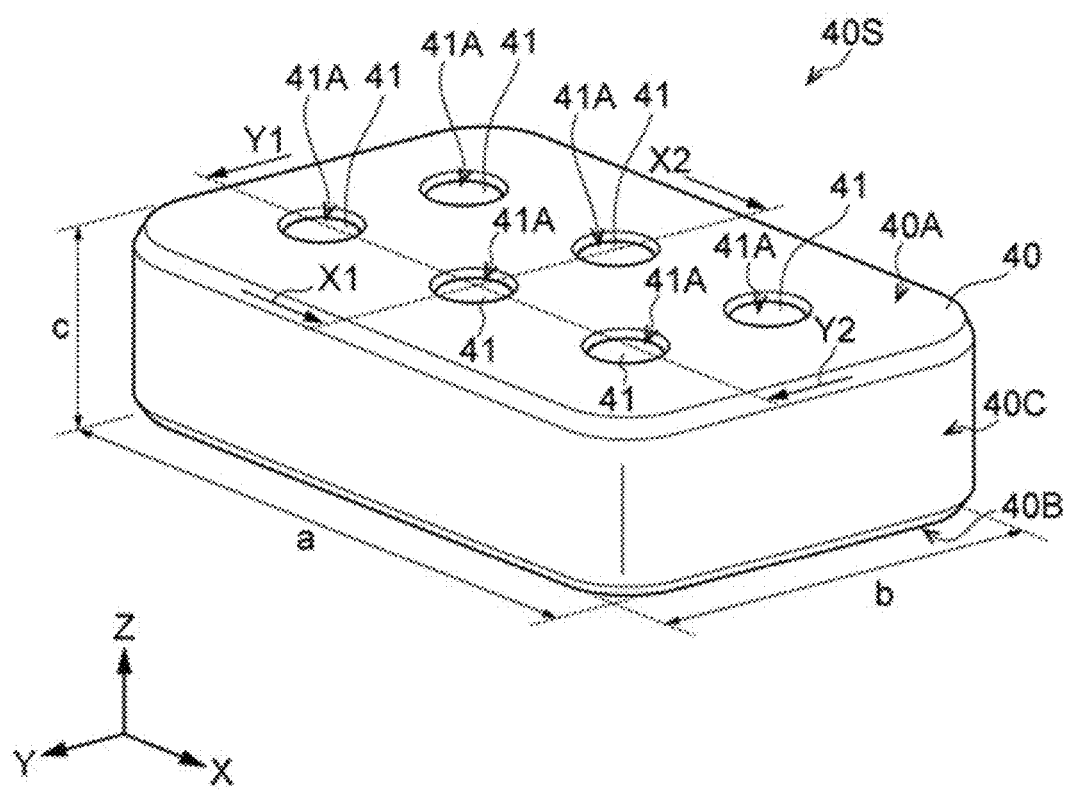
FIG. 11 is a perspective view of a solid milk according to Modified Example 3.
Figure 12:
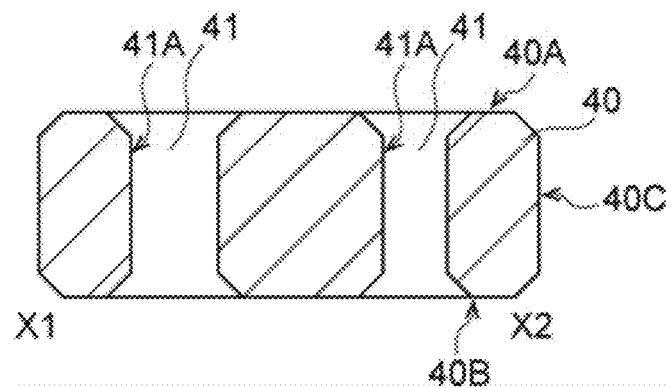
FIG. 12 is a cross-sectional view taken along X1-X2 of the solid milk of FIG. 11.
Figure 13:
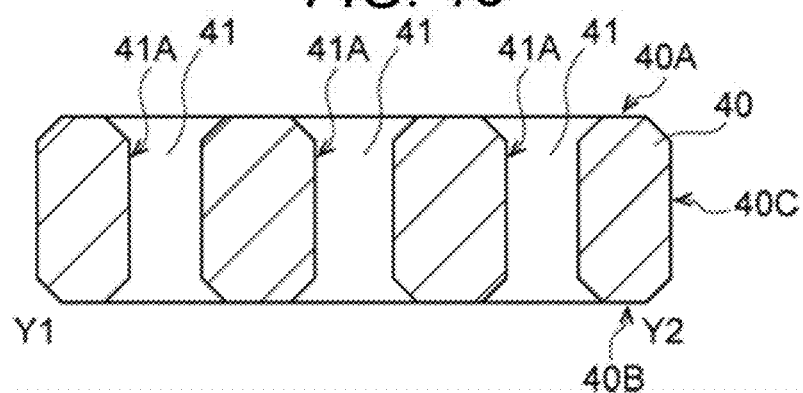
FIG. 13 is a cross-sectional view taken along Y1-Y2 of the solid milk of FIG. 11.

FIG. 11 is a perspective view of a solid milk 40S according to the present modified example. FIG. 12 is a cross-sectional view parallel to a YZ plane taken along X1-X2 of FIG. 11. FIG. 13 is a cross-sectional view parallel to an XZ plane taken along Y1-Y2 of FIG. 11. In the present modified example, six holes 41 are provided.

The solid milk 40S includes a rectangular parallelepiped-shaped body 40 having a first face 40A and a second face 40B facing each other back to back, and a lateral face 40C. Six holes 41 penetrating the body 40 from the first face 40A to reach to the second face 40B are provided in the body 40. The sizes of the six holes 41 are selected so that a volume obtained by subtracting the total volume of the portions of the six holes 41 from the volume of the rectangular parallelepiped shape of the body 40 becomes a predetermined value. The positions of the six holes 41 are arranged to be point-symmetric with respect to the central portion of the first face 40A or to be line-symmetric with respect to a line parallel to the X axis passing through the center of the first face 40A or a line parallel to the Y axis.

The first face 40A, the second face 40B, the lateral face 40C, and an inner surface 41A of the hole 41 are outer surface harder than an inner part of the body 40. The inner surface 41A of the hole 41 constitutes a tubular column provided between the first face 40A and the second face 40B. A corner part of the body 40 and an edge of the hole 41 are chamfered to form outer surfaces harder than the inner part of the body 40.

In the solid milk 40S of the present modified example, six holes 41 penetrating the body 40 constituting the solid milk 40S are provided, and the inner surface 41A of the hole 41 is an outer surface harder than the inner part of the body 40 similar to the first face 40A, the second face 40B, and the lateral face 40C of the body 40. Therefore, the solid milk 40S of the present embodiment is configured so that in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk. Therefore, a product can be prevented from being damaged when the product is dropped to improve transportation suitability.

Modified Example 4

In the solid milk of each of the embodiments and the Modified Examples 1 to 3, one or more holes are provided in the body of the solid milk, but the present invention is not limited thereto. For example, even if the hole is not formed in the solid milk, the solid milk can be configured so that the number of times of dropping leading to breakage when EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times by a hardening means or hardening conditions described in the embodiments. For example, the surface may be hardened by irradiating the compression molded body of the powdered milk (before hardening) with a near-infrared lamp, a far-infrared lamp, a laser light, or a thermal light source obtained by combining a plurality of light sources instead of the hardening treatment by the humidification treatment and the drying treatment described in the embodiments. In addition, the compression molded body of the powdered milk may be hardened by performing the humidification treatment using water vapor heated to a temperature of higher than 100° C. instead of the humidification treatment performed at the humidity of 60% RH to 100% RH and the temperature of 30° C. to 100° C. described in the embodiment, and then performing the drying treatment. Therefore, a product can be prevented from being damaged when the product is dropped to improve transportation suitability.

Application Example

Solid milk is a type of solid food. Each of the embodiments and Modified Examples 1 to 4 described above is the solid milk obtained by compression molding the powdered milk, but can also be applied to a solid food formed by compression molding a powder. For example, a raw material, for example, protein powders such as whey protein, soybean protein, and collagen peptide, amino acid powders, and oil and fat-containing powders such as middle chain triglyceride (MCT) can be applied to a compression molded solid food. Milk sugar or other sugars are appropriately added to the powder of the raw material, and the powder is compression molded into a shape having a hole penetrating a body as illustrated in each of the embodiment and Modified Examples 1 to 4 described above, or thereafter, the powder is subjected to a hardening treatment using a laser or the like to be processed into a solid food. Such a solid food is configured to have an outer surface harder than an inner part of the body. Therefore, a product can be prevented from being damaged when the product is dropped to improve transportation suitability. In addition, other than milk sugar or other sugars, nutritional components such as fats, proteins, minerals, and vitamins or food additives may be added to the powder of the raw material.

Further, the protein powders of the food powder may be milk casein, meat powder, fish powder, egg powder, wheat protein, wheat protein decomposition product, or the like. One kind or two or more kinds of these protein powders may be added.

Further, the whey protein of the food powder is a generic term for proteins other than casein in milk. It may be classified as whey proteins. Whey protein is composed of a plurality of components such as lactoglobulin, lactalbumin, and lactoferrin. When a milk raw material such as milk is adjusted to be acidic, a protein to be precipitated is casein, and a protein not to be precipitated is whey protein. Examples of the powder raw material containing whey proteins include WPC (whey protein concentrate, protein content: 75 to 85% by mass) and WPI (whey protein isolate, protein content: 85% by mass or more). One kind or two or more kinds of these may be added.

Further, the soybean protein (soybean protein) of the food powder may be a protein contained in soybean or may be extracted from soybean. It is also possible to use those purified from raw material soybeans. The purification method is not particularly limited, and a conventionally known method can be used. As such a soybean protein, a powder commercially available as a material for food and drink, a material for medical use, or a supplement food can be used. One kind or two or more kinds of these may be added.

The amino acids contained in the amino acid powders of the food powder are not particularly limited, and examples thereof include arginine, lysine, ornithine, phenylalanine, tyrosine, valine, methionine, leucine, isoleucine, tryptophan, histidine, proline, cysteine, glutamic acid, asparagine, aspartic acid, serine, glutamine, citrulline, creatine, methyllysine, acetyllysine, hydroxylysine, hydroxyproline, glycine, alanine, threonine, and cystine. One kind or two or more kinds of these may be added.

The amino acids contained in the amino acid powder of the food powder may be either a natural product or a synthetic product, and a single amino acid or a mixture of a plurality of amino acids can be used. In addition, as the amino acids, not only free amino acids but also salts such as sodium salt, hydrochloride and acetate, and derivatives such as carnitine and ornithine can be used.

In the description herein, the term "amino acids" includes α-amino acids, β-amino acids, and γ-amino acids. The amino acids may be either L-form or D-form.

Further, the oils and fats contained in the oil and fat-containing powders of the food powder are animal oils and fats, vegetable oils and fats, and fractionated oils, hydrogenated oils, and transesterified oils thereof, in addition to the MCT oil described above. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

Further, the sugars of the food powder are, for example, oligosaccharides, monosaccharides, polysaccharides, artificial sweeteners, or the like, in addition to the milk sugar described above. One kind or two or more kinds of these may be added. Oligosaccharides are, for example, milk sugar, cane sugar, malt sugar, galacto-oligosaccharides, fructo-oligosaccharides, lactulose, and the like. Monosaccharides are, for example, grape sugar, fruit sugar, galactose, and the like. Polysaccharides are, for example, starch, soluble polysaccharides, dextrin, and the like.

Further, as an example of the food additives of the food powder, sweeteners can be exemplified. The sweeteners may be any sweetener commonly used in foods and pharmaceuticals, and may be either a natural sweetener or a synthetic sweetener. The sweeteners are not particularly limited, and examples thereof include glucose, fructose, maltose, sucrose, oligosaccharide, sugar, granulated sugar, maple syrup, honey, molasses, trehalose, palatinose, maltitol, xylitol, sorbitol, glycerin, aspartame, advantame, neotame, sucralose, acesulfame potassium, and saccharin.

Further, as an example of the food additives of the food powder, acidulants can be exemplified. The acidulants are not particularly limited, and examples thereof include acetic acid, citric acid, anhydrous citric acid, adipic acid, succinic acid, lactic acid, malic acid, phosphoric acid, gluconic acid, tartaric acid, and salts thereof. The acidulants can suppress (mask) bitterness caused by the type of the amino acids.

Further, the food powder may contain any components such as fats, proteins, minerals, and vitamins as nutritional components.

Examples of the fats include animal oils and fats, vegetable oils and fats, fractionated oils, hydrogenated oils, and transesterified oils thereof. One kind or two or more kinds of these may be added. Animal oils and fats are, for example, milk fat, lard, beef tallow, fish oil, and the like. Vegetable oils and fats are, for example, soybean oil, rapeseed oil, corn oil, coconut oil, palm oil, palm kernel oil, safflower oil, cotton seed oil, linseed oil, medium chain triglyceride (MCT) oil, and the like.

The proteins, for example, milk proteins and milk protein fractions, animal proteins, vegetable proteins, peptides and amino acids of various chain length obtained by decomposing those proteins with enzymes etc., and the like. One kind or two or more kinds of these may be added. Milk proteins are, for example, casein, whey proteins (α-lactoalbumin, β-lactoglobulin, and the like) for example, whey protein concentrate (WPC), whey protein isolate (WPI), and the like. Examples of the animal proteins include egg protein (egg powder), meat powder, and fish powder. Examples of the vegetable proteins include soybean protein and wheat protein. Examples of the peptides include a collagen peptide. Examples of the amino acids include taurine, cystine, cysteine, arginine, and glutamine. One kind or two or more kinds of these may be added.

Examples of the minerals include iron, sodium, potassium, calcium, magnesium, phosphorus, chlorine, zinc, iron, copper, and selenium. One kind or two or more kinds of these may be added.

Examples of the vitamins include vitamin A, vitamin D, vitamin E, vitamin K, vitamin B1, vitamin B2, vitamin B6, vitamin B12, vitamin C, niacin, folic acid, pantothenic acid, and biotin. One kind or two or more kinds of these may be added.

Examples of other food materials include cocoa powder, cacao powder, chocolate powder, microorganism powder containing useful microorganisms such as lactic acid bacteria and bifidobacteria, milk fermented ingredient powder made from a culture obtained by adding microorganisms to milk and fermenting the mixture, cheese powder having cheese as a powder, functional food powder having functional food as a powder, and total nutrition food powder having total nutrition food as a powder. One kind or two or more kinds of these may be added.

The solid food according to the present invention may be in the form of a food for daily ingestion, a health food, a health supplement food, a health functional food, a food for specified health use, a nutrient functional food, a supplement, a function-indicating food, or the like.

First Example (Preparation of Example 1)

A solid milk sample having the same shape as that in the embodiment illustrated in each of FIGS. 1 to 3 was prepared and used as Example 1. Regarding the size of the body of the solid milk, the side a in the X-axis direction is 31 mm, the side b in the Y-axis direction is 24 mm, and the side c in the Z-axis direction is 12.5 mm. A volume excluding the portion of the hole 11 was about 8,250 mm$^3$. The sizes of the die and the punch of the tablet press and the compression pressure were adjusted to obtain the above-described size, and 5.4 g of a powdered milk was compression molded to form a compression molded body of the powdered milk. The compression molded body of the powdered milk obtained was subjected to the humidification treatment at a humidification temperature of 80° C. and further subjected to the drying treatment at a drying temperature of 80° C. to obtain a solid milk subjected to the hardening treatment. The humidification treatment time was appropriately adjusted so that the hardness of the solid milk sample after the hardening treatment was 20 to 90 N. As for the drying time, the time was adjusted so that the amount corresponding to the increased weight at the time of humidification was dried out.

(Preparation of Example 2)

A solid milk sample having the same shape as that in Modified Example 1 illustrated in each of FIGS. 5 to 7 was prepared in the same manner as that of Example 1, except that the number of holes 21 were 2, and the prepared solid milk sample was used as Example 2. The hardness of the solid milk sample after the hardening treatment was set to 20 to 90 N.

(Preparation of Example 3)

A solid milk sample having the same shape as that in Modified Example 2 illustrated in each of FIGS. 8 to 10 was prepared in the same manner as that of Example 1, except that the number of holes 31 were 4, and the prepared solid milk sample was used as Example 3. The hardness of the solid milk sample after the hardening treatment was set to 20 to 90 N.

(Preparation of Example 4)

A solid milk sample having the same shape as that in Modified Example 3 illustrated in each of FIGS. 11 to 13 was prepared in the same manner as that of Example 1, except that the number of holes 41 were 6, and the prepared solid milk sample was used as Example 4. The hardness of the solid milk sample after the hardening treatment was set to 20 to 90 N.

Preparation of Comparative Example

Figure 14:
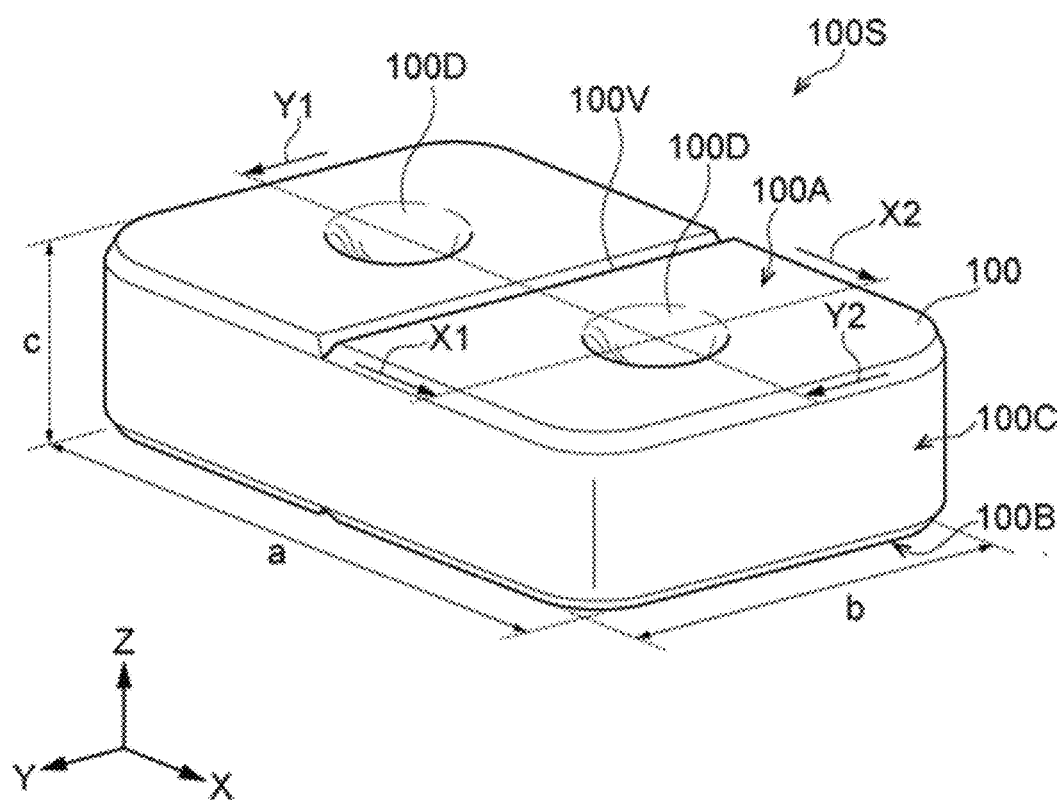
FIG. 14 is a perspective view of a solid milk according to Comparative Example.
Figure 15:
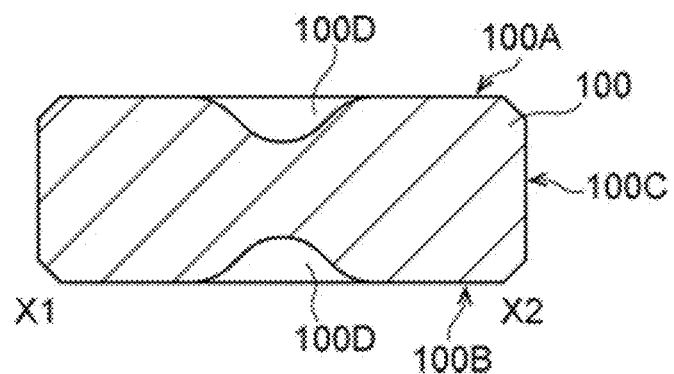
FIG. 15 is a cross-sectional view taken along X1-X2 of the solid milk of FIG. 14.
Figure 16:
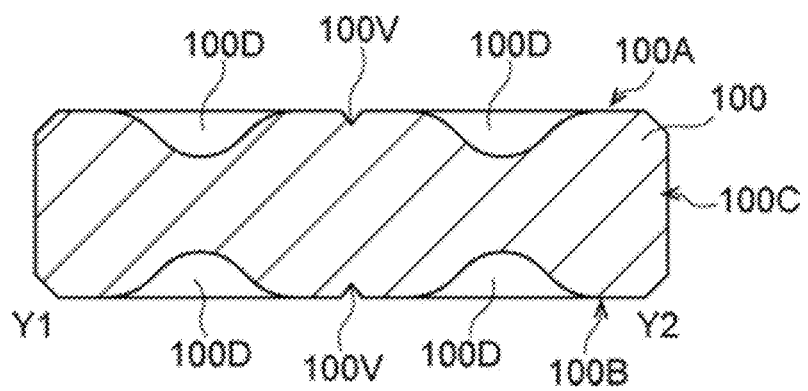
FIG. 16 is a cross-sectional view taken along Y1-Y2 of the solid milk of FIG. 14.

A solid milk sample was prepared in the same manner as that of Example 1, except that a recess was provided instead of the hole, and the prepared solid milk sample was used as Comparative Example. FIG. 14 is a perspective view of a solid milk 100S according to Comparative Example. FIG. 15 is a cross-sectional view parallel to a YZ plane taken along X1-X2 of FIG. 14. FIG. 16 is a cross-sectional view parallel to an XZ plane taken along Y1-Y2 of FIG. 14. The solid milk 100S includes a rectangular parallelepiped-shaped body 100 having a first face 100A and a second face 100B facing each other back to back, and a lateral face 100C. The side a in the X-axis direction is 31 mm, the side b in the Y-axis direction is 24 mm, and the side c in the Z-axis direction is 12.5 mm. In the body 100, two recesses 100D are provided on the first face 100A, and two recesses 100D are provided on the second face 100B. Each of the recesses 100D is formed by a smooth curve face. The size of the recess 100D is selected so that the volume obtained by subtracting the volume of the portion of the recess 100D from the volume of the rectangular parallelepiped-shaped body 100 is equal to the volume in Example 1. In addition, in Comparative Example, each of the first face 100A and the second face 100B is provided with a secant line 100V along a direction parallel to the Y axis. The hardness of the solid milk sample after the hardening treatment was set to 20 to 90 N.

(Evaluation of Transportation Suitability Using Drop Tester)

In order to perform evaluation of transportation suitability by the shape, a test in which the solid milk sample prepared in each of Examples 1 to 4 and Comparative Example as described above was dropped from a height of 50 to 300 mm a plurality of times was performed. As a drop face in the drop test, a drop face of a packaged freight drop tester DTS-50 manufactured by SHINYEI Technology Co., LTD. was used. A material of the drop face conforms to the method for the drop test for packaged freights according to JIS standard Z 0202. In the tester, in the drop test from the height that cannot be performed, only the drop face was used. Here, the drop face of the tester was a horizontal face. The second face of the solid milk sample was positioned perpendicular to the drop face at a height of 50 to 300 mm from the drop face as a bottom face, and the second face of the solid milk sample was fixed by being interposed between two points or three points of the lateral face of the solid milk sample. The fixed points were simultaneously separated from the solid milk sample to allow the solid milk sample to freely fall. As for a dropping posture of each of the solid milk samples of Examples 1 to 4 and Comparative Example at the time of free falling, the test was performed so that the second face was parallel to the drop face.

The definition of the drop face in JIS is as follows. (a) A mass of a member constituting the drop face is desirably 50 times or more the mass of the sample. (b) A horizontal difference is 2 mm or less at any two points on the surface. (c) Do not cause deformation of 0.1 mm or more at any point on the surface under a static load of 98 N {10 kgf}/100 mm$^2$. (d) The drop face is required to have a sufficient size so that the sample can be completely dropped. (e) The drop face is formed of a rigid material such as concrete, stone, or a steel plate.

It was determined that the solid milk sample was fractured when the weight of the solid milk sample was reduced by 9% or more of the initial weight due to breakage occurring at the time of dropping, and the broken surface spread to four faces. When the weight of the largest small piece of the solid milk sample (5.4 g before the test) after the drop test was 5 g or less, it was defined as "breakage". As the evaluation method of the drop test, the solid milk sample was dropped onto a drop face from a height of 50 mm to 300 mm and the number of times of dropping leading to breakage was measured.

Figure 17:
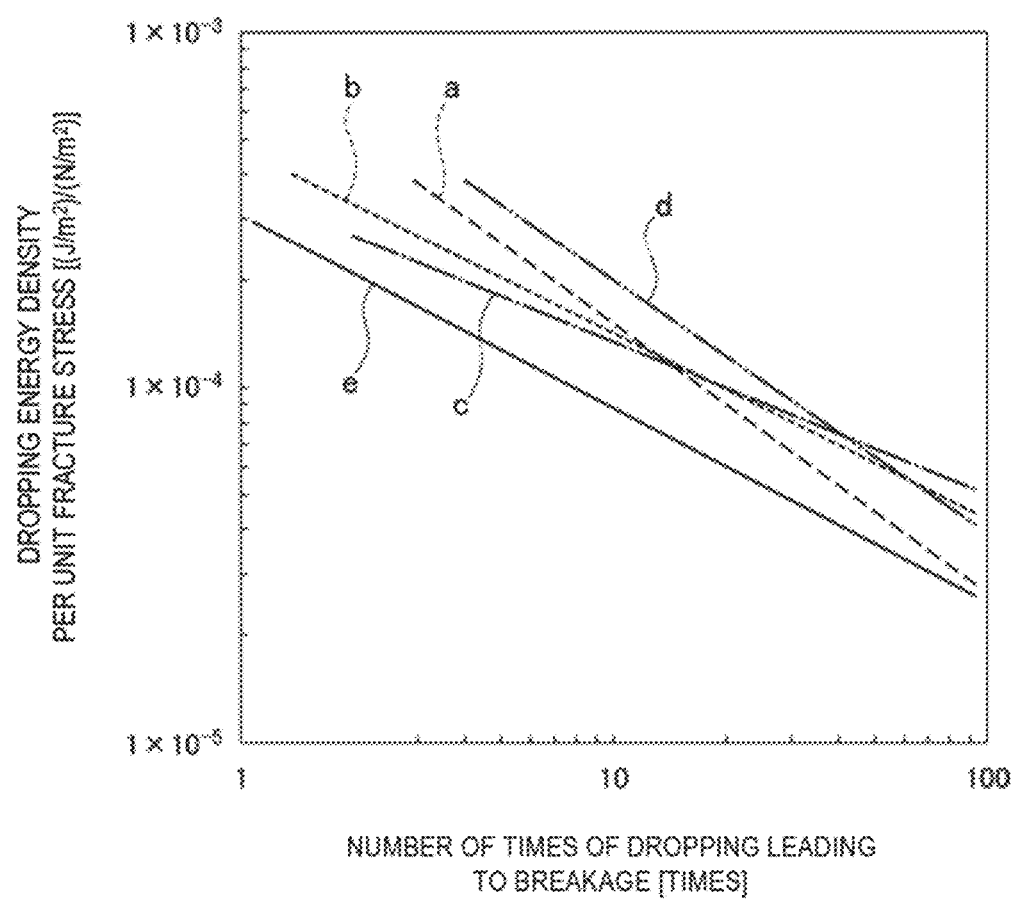
FIG. 17 is a graph showing the number of times of dropping leading to breakage with respect to a dropping energy density per unit fracture stress according to First Example.

The drop test was repeated for each solid milk sample, and the number of times of dropping leading to breakage of each of the solid milk samples (the number of times of the drop test leading to "breakage" of the sample) was examined. A dropping energy density per unit fracture stress obtained by dividing a dropping energy density applied when the solid milk sample is dropped from each of heights of 50 mm to 300 mm and collides with the drop face (weight of sample×gravity acceleration×height/fractured area) [J/m$^2$] by a hardness (fracture stress) [N/m$^2$] per unit fractured area was calculated. Assuming that the area in which the sample is broken when dropped and the area when the sample is broken by the static break test are equal to the minimum area of the sample, the index can also be interpreted as a dropping energy per unit hardness [J/N]. The index is shown on the vertical axis of FIG. 17 (here, the fractured area is a cross-sectional area (b×c) of the YZ plane of each sample). In addition, the number of times of dropping leading to breakage obtained in the above is shown on the horizontal axis of FIG. 17. FIG. 17 is a graph showing the number of times of dropping leading to breakage with respect to the dropping energy density per unit fracture stress. In FIG. 17, a indicates the results of Example 1, b indicates the results of Example 2, c indicates the results of Example 3, d indicates the results of Example 4, and e indicates the results of Comparative Example.

FIG. 17 illustrates a graph in which the number of times of dropping leading to breakage is increased as the dropping energy density per unit fracture stress decreases, and each of a, b, c, d, and e is downward sloping. This is because the solid milk sample is less likely to be broken and the number of times of dropping leading to breakage is increased as the dropping energy per unit hardness decreases. In addition, it was confirmed that even in a case where the dropping energy density per unit fracture stress was small such as when the drop height was low, the number of times of dropping was increased, resulting in breakage. In addition, among a, b, c, d, and e, the result of Comparative Example indicated by e is located on the lowest side or the left side, and shows that in a case where the solid milk sample is dropped at the dropping energy per the same unit hardness, the solid milk sample is broken in a small number of times of dropping.

In addition, it is shown that in a case where the solid milk sample is dropped at a dropping energy density per the same unit fracture stress, the solid milk sample of each of Examples 1 to 4 requires a larger number of times of dropping leading to breakage than the solid milk sample of Comparative Example. That is, it was confirmed that in the drop test of the solid milk sample of each of Examples 1 to 4, the number of times of dropping leading to breakage when a dropping energy density per unit fracture stress EF is $2 \times 10^{-4}$ [(J/m$^2$)/(N/m$^2$)] is 3 times or more, the number of times of dropping leading to breakage when EF is $1 \times 10^{-4}$ [(J/m$^2$)/(N/m$^2$)] is 10 times or more, and the number of times of dropping leading to breakage when EF is $5 \times 10^{-5}$ [(J/m$^2$)/(N/m$^2$)] is more than 30 times.

It was confirmed that in the solid milk sample of each of Examples 1 to 4 in which the hole was provided, the number of times of dropping leading to breakage was larger than in the solid milk sample of Comparative Example in which the recess was provided instead of the hole, the resistance to breakage was high, and the transportation suitability was improved. In addition, it was confirmed that among a, b, c, and d, d was located on the uppermost side or the right side, and when the number of holes was 6 rather than 1, 2, or 4, the number of times of dropping leading to breakage was large, the resistance to breakage was high, and the transportation suitability was improved.

Second Example (Solubility Test)

In order to perform evaluation of the solubility by the shape, a solubility test was performed on the solid milk samples of Examples 1 to 4 and Comparative Example prepared as described above. First, one solid milk sample was put in a stirring basket. The stirring basket is a bottomed tubular container with a lid which has an inner diameter of 30 mm and a height of 36 mm, and has a lateral part, a bottom part, and a lid part. The lateral part, the bottom part, and the lid part are formed with a stainless steel net having 18 meshes (opening: 1.01 mm). Four blades are evenly provided in the inner face of the lateral part of the stirring basket. Each of the four blades is a plate having a thickness of 1.5 mm, a width of 4 mm, and a length of 34 mm, is disposed so that the longitudinal direction becomes parallel to the central axis of the stirring basket, and is provided to protrude from the inner face of the lateral part toward the center thereof. In a state where the stirring basket was immersed in 200 ml of warm water (50±1° C.) contained in a 300 ml beaker so that the solid milk sample was completely submerged in water, the stirring basket was rotated at a rotation speed of 0.5 m/s (peripheral speed). The stirring basket was held at a height of 5 mm from the inner face of the beaker bottom part. The dissolution process from the solid milk sample starting to dissolve until the solid milk sample completely dissolving was measured at certain time intervals on the basis of electric conductivity. It was confirmed from the test results that the solubility in each of Examples 1 to 4 was higher than that in Comparative Example. Among Examples 1 to 4, Example 4 (the number of holes was 6) showed the highest solubility. It is considered that the fact that the solubility in each of Examples 1 to 4 is higher than that in Comparative Example, and further, Example 4 shows the highest solubility because the larger the surface area of the solid milk is, the higher the solubility is.

Incidentally, the present disclosure may have the following configuration. When the present disclosure has the following configuration, a product can be prevented from being damaged when the product is dropped to improve transportation suitability.

(1) A solid food having a solid form obtained by compression molding a powder, in which in a case where a drop test in which the solid food is dropped onto a drop face is repeated until the solid food is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid food.

(2) The solid food according to (1), in which one or more through-holes are provided in a body of the solid food.

(3) A solid milk having a solid form obtained by compression molding a powdered milk, in which in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk.

(4) The solid milk according to (3), in which one or more through-holes are provided in a body of the solid milk.

(5) A solid food having a solid form obtained by compression molding a powder, in which the solid food is formed by performing a hardening treatment on a compression molded body of the powder obtained by compression molding the powder so that in a case where a drop test in which the solid food is dropped onto a drop face is repeated until the solid food is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid food.

(6) A solid milk having a solid form obtained by compression molding a powdered milk, in which the solid milk is formed by performing a hardening treatment on a compression molded body of the powdered milk obtained by compression molding the powdered milk so that in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk.

REFERENCE SIGNS LIST 10, 20, 30, 40 Body
10A, 20A, 30A, 40A First face
10B, 20B, 30B, 40B Second face
10C, 20C, 30C, 40C Lateral face
10S, 20S, 30S, 40S Solid milk
11, 21, 31, 41 Hole
11A, 21A, 31A, 41A Inner surface

The invention claimed is:

1. A solid milk having a solid form obtained by compression molding a powdered milk, wherein in a case where a drop test in which the solid milk is dropped onto a drop face is repeated until the solid milk is broken, the number of times of dropping leading to breakage when a dropping energy density per unit fracture stress EF is $2\times10^{-4}$ [$(J/m^2)/(N/m^2)$] is 3 times or more, the number of times of dropping leading to breakage when EF is $1\times10^{-4}$ [$(J/m^2)/(N/m^2)$] is 10 times or more, and the number of times of dropping leading to breakage when EF is $5\times10^{-5}$ [$(J/m^2)/(N/m^2)$] is more than 30 times, EF being obtained by dividing a dropping energy density in the drop test by a fracture stress of the solid milk, wherein one or more through-holes are provided in a body of the solid milk.

* * * * *